Figure 1:
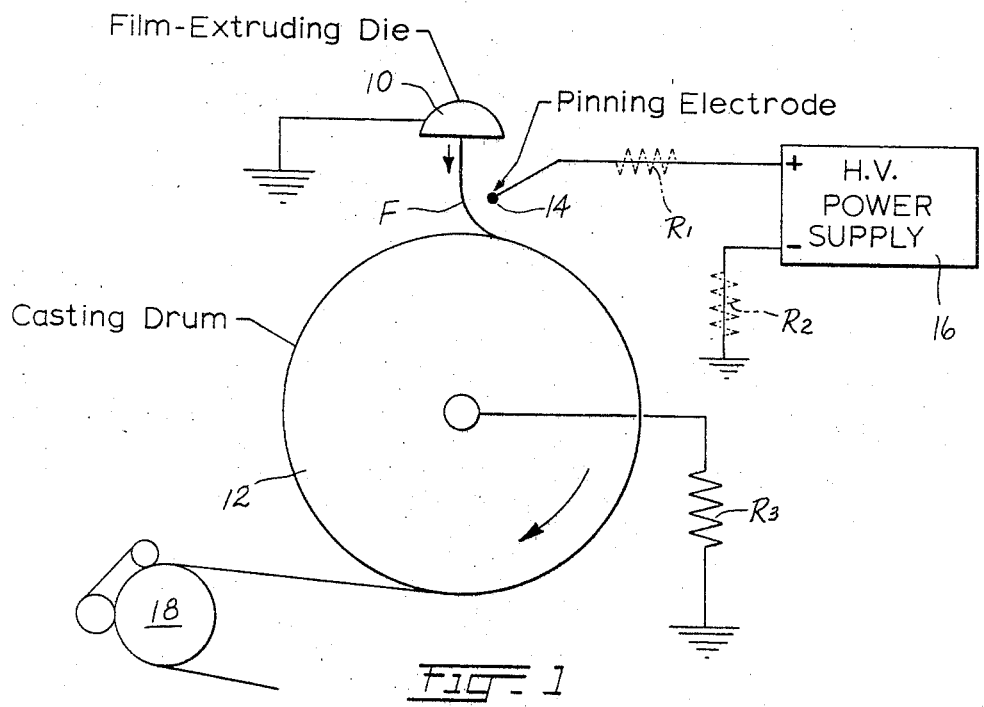

INVENTOR.
Joseph B. Busby
ATTORNEY

United States Patent Office 3,427,686
Patented Feb. 18, 1969

3,427,686
METHOD AND APPARATUS FOR QUENCHING POLYMERIC FILMS
Joseph B. Busby, Greenville, S.C., assignor to Celanese Corporation, New York, N.Y., a corporation of Delaware
Filed Apr. 10, 1967, Ser. No. 629,773
U.S. Cl. 18—15                9 Claims
Int. Cl. B29c *17/00;* B29b *3/00, 5/04*

This invention relates to the handling of films of insulating material, particularly films of thermoplastic material being extruded and being deposited on a casting drum.

The term "electrostatic pinning" is used to signify electrostatic attraction of a film toward and against a surface, usually a drum or a roller. This effect is achieved in a known manner by electrostatically charging a film that is advancing toward a rotating roller, and because the roller is grounded the film is drawn against its surface. Pinning is used for quenching a newly extruded film that is in its plastic state as it approaches a polished casting drum, and helps in forming the desired finish on the film. Electrostatic pinning is also useful in film-feeding apparatus, to resist sliding of a film across the surface of a roller that forms part of a film-tensioning arrangement.

The electrostatic charge is applied to a moving film by means of a field discharge from a sharp electrode maintained at a high positive potential relative to ground. Commonly the electrode takes the form of a small-diameter wire or a row of pointed wires. The film-handling apparatus is at ground potential. Consequently, the moving charged film is electrostatically attracted and firmly pinned to the surface of the grounded machine component toward which the film advances.

A problem has arisen in the use of electrostatic pinning that is particularly acute in the casting of films. The desired charge is applied to the film by a limited ionization-discharge process occurring at the electrode, or "pinning wire" as it is sometimes called. This limited ion-discharge changes to arcing at times, due perhaps to changes in humidity, air pressure, or process parameters. The arcing may extend to a portion of the drum that is not covered by the film, and in that event a line (unpinned portion) forms across the width of the film which causes it to break out. Arcing may also puncture the film, making it unsuitable for many uses.

An object of the present invention resides in providing a novel method and apparatus for electrostatic pinning of plastic films. A particular object resides in the improvement of electrostatic pinning as used in film-casting equipment, for minimizing or avoiding arcing.

An illustrative apparatus is shown in the annexed drawing and described below for achieving these and other objects. The illustrative apparatus is a film-casting machine having an extruding die which is spaced from a casting drum. A pinning electrode is located adjacent to the film between the extruding die and the drum. The electrostatic power supply has its positive terminal connected to the pinning electrode and its negative electrode is grounded. The extruding die is also grounded but the casting drum is maintained at a substantial potential above ground. In this arrangement, the intense electrostatic field gradient that develops at the fine-wire pinning electrode or, with pointed wires, at the sharp ionizing parts of the pinning electrode, provides an ion discharge, and this reaches the film to impart the desired charge. While a reduced potential difference may develop between the film and the drum which is at above-ground potential, as compared to apparatus having a grounded drum, nevertheless the film is very effectively pinned to the drum. This arrangement helps to minimize or avoid the occurrence of arcing and the resulting damage to the film.

A further object of the invention resides in providing a novel self-adjusting apparatus and method for introducing changes in the pinning system automatically in a sense to oppose any tendency of arcing conditions to develop.

In achieving this object in the illustrative apparatus described below, the drum to which the film is to be pinned is kept at a floating potential by interposing a resistor between the drum and ground. If environmental conditions should change in the sense to create incipient arcing conditions, then the ionization increases and more current is carried from the film via the drum to the negative terminal of the bias supply. This current passes through the resistor, and as the current rises, the potential of the drum rises. This effect reduces the voltage difference between the pinning electrode and the drum, and consequently reduces the likelihood of arcing to the drum to occur.

The nature of the invention, including the above and further objects and novel features will be best appreciated from the following detailed description of an illustrative embodiment of the invention, which is shown in the annexed drawings.

Figure 2:
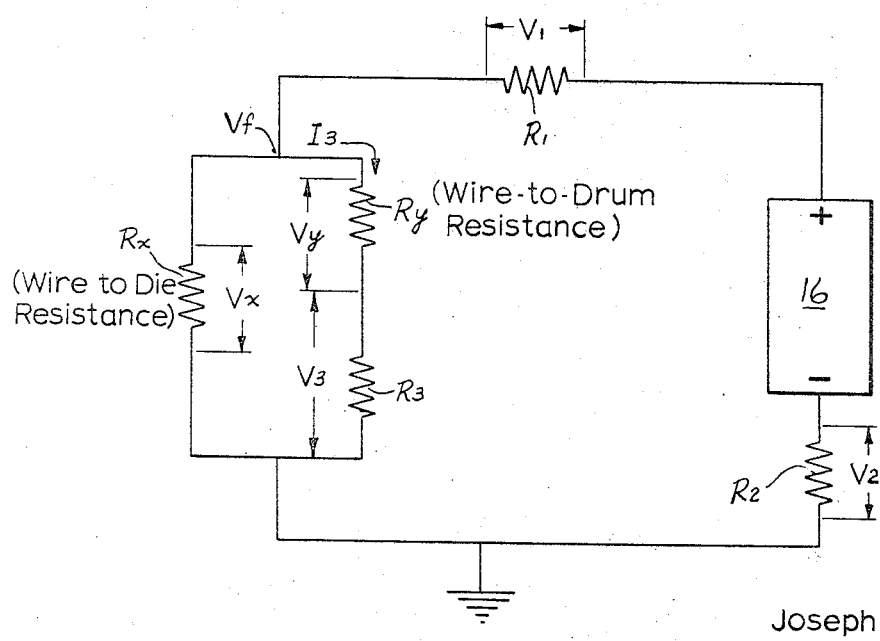

In the drawings:

FIG. 1 is a diagram of film casting apparatus incorporating the novel casting system in which hypothetical resistors are shown in phantom; and FIG. 2 is an effective circuit diagram of the apparatus of FIG. 1.

Referring now to FIG. 1, an extruding die 10 is disposed a short distance from casting drum 12, two to three inches away, for example. The drum is carried on insulated bearings and may contain a customary cooling-liquid system. Suitable means (not shown) rotates drum 12 at a desired rate.

A pinning electrode 14 is disposed a short distance from the film F, between extruding die 10 and drum 12. Electrode 14 is preferably a fine wire parallel to the drum, but this electrode may comprise many pointed wires arranged in a row perpendicular to the view. High voltage direct-current supply 16 has its positive terminal connected to the pinning electrode. The negative terminal of the supply is grounded as is die 0. Resistor $R_3$ is connected between drum 12 and ground.

The film emerging from die 10 approaches casting drum 12 which has a high polish. This drum is of metal, and while it may in some cases have an insulating cover, it has an exposed metal surface in this illustrative apparatus. The high potential on pinning electrode 14 creates a steep voltage gradient, due to the small diameter of the wire, so that the air along the wire electrode is ionized.

Positively charged ions in the air are transferred to the surface of the film, leaving the film with a net positive charge. This process of charging the film progresses even as the film becomes tangent to the drum and makes contact. When the charged film reaches the drum, it is electrostatically attracted firmly against the drum due to the fact that the drum operates at several thousand volts negative relative to the electrode. The film is soft at this stage, and the drum has a high polish, so that this attraction gives the film a smooth surface.

The charge on the film gradually leaks off (incompletely) during the travel of the film with the drum. This charge is collected by the drum. The resulting current flows to ground via resistor $R_3$. This current produces a voltage drop in resistor $R_3$ that is a large part of the voltage of the power supply. Two effects develop immediately. First, the drum operates at a potential difference from pinning electrode 14, that is lower than would prevail if drum 12 were grounded. And second, effective ionization takes place at the pinning electrode, due to the electrostatic field gradient at the fine-wire electrode 14. This field gradient is maintained at virtually full effectiveness by the grounded extruding die. The ion-discharge occurring at the pinning electrode remains amply effective to charge the film, and the advancing film is electrostatically pinned to the drum because the drum operates at a large negative potential relative to the pinning electrode; but because resistor $R_3$ reduces the potential difference between the pinning electrode and the casting drum, the tendency of arcing to occur is minimized. Indeed, if changing environmental conditions should cause an increase in the current path through the drum, such as to approach arcing levels, this increased current produces an increased voltage drop in resistor $R_3$. Consequently, the voltage difference between the pinning electrode and the casting drum is further reduced by any current rise that might lead to incipient arcing, and the reduction in voltage difference reverses the drift toward arcing.

The attraction of the film against the drum also has the effect of creating a frictional resistance of the film to sliding, such as might occur if the film were being drawn away from drum 12. Such an effect is desirable, when tension is to be developed in the film between one roll such as drum 12 and another part of the film-handling apparatus, here diagrammatically represented by roll 18. By driving roll 18 at a rate slightly higher than drum 12, tension would develop in film F.

It would be possible to locate resistors at other parts of the circuit so as to create a voltage reduction when imminent arcing conditions develop. For example, a resistor $R_1$ might be interposed in the lead to the pinning electrode, or resistor $R_2$ might be interposed in the ground-return connection of the high voltage supply 16. Such resistors would develop increased voltage drops whenever the current started to rise toward arcing levels, but there is unique advantage to locating the resistor between the casting drum and ground. This may be understood from the following analysis:

In FIG. 2 all three resistors $R_1$, $R_2$ and $R_3$ are shown. Resistors $R_1$ and $R_2$ are hypothetical, and are shown in broken lines in FIG. 1. Let it be assumed that these are 1-megohm resistors and that the supply 16 provides 10 kilovolts, and that there is normally a current of 1.0 milliamperes. In the circuit of FIG. 2, $R_x$ is the effective resistance between the pinning wire 14 and the die 10, and $R_y$ is the effective resistance between the pinning wire and drum 12. Both of these resistances are variable, and both are very high resistances. A voltage $V_p$ at the pinning electrode 14 should be 9.5 kilovolts for the effective pinning to occur.

Condition I.—If it should be considered that $R_2$ and $R_3$ are not used and are therefore zero in FIG. 2, and that $R_1$ is connected in the circuit:

$V_p = V - V_1$ $\qquad V_1 = IR_1$
$V_p = 10 \times 10^3 - 1 \times 10^3$ $\qquad V_1 = (1 \times 10^{-3})(1 \times 10^6)$
$V_p = 9$ kv. $\qquad V_1 = 1 \times 10^3$ Since $V_p$ is less than 9.5 kv., good pinning is not achieved. Moreover, as the current tends to increase, $V_p$ would continue to drop.

Condition II.—If it is considered that only $R_2$ is used, $R_1$ and $R_3$ in FIG. 2 become zero. The analysis is the same as above. $R_2$ develops a 1.0 kv. drop. This leaves an inadequate pinning voltage $V_p$ of 9.0 kv., which tends to be further reduced as the imminent arcing conditions develop.

Condition III.—If it is assumed that $R_1$ and $R_2$ of FIG. 2 are zero (the condition in FIG. 1), then $V_p = 10$ kv. so that good ion-discharge conditions prevail at the pinning electrode. However, should $R_y$ show any tendency to decrease and indicate imminent arcing conditions, $V_3$ would increase. The consequent decrease in $V_y$ will tend to suppress development of an arc. Accordingly, the circuit of FIG. 1 has two distinctive advantages over a pinning circuit using a grounded casting drum: The normal condition is one where the pinning electrode operates at a level that is desired for producing the ion discharge used for electrostatically charging the film, and yet the voltage tending to cause arcing to the drum is reduced so as to reduce or avoid arcing conditions. Secondly, in case of a current rise suggesting a drift toward arcing, there is a rise in the voltage $V_3$ and a reduction in the voltage $V_y$ which thus has a reduced capability of producing an arc; and at the same time, the pinning voltage $V_p$ remains high and therefore effective for pinning.

In an example, the dimensions of a casting machine using the voltages mentioned above are as follows: pinning wire 14, 0.008 inch diameter; wire-to-diet space, approx. 1 inch wire-to-drum space, ⅜ to ½ inch; wire-to-film space, ⅜ to ½ inch.

The foregoing represents a presently preferred embodiment of the invention. However, it will be recognized that modifications and variations will occur to those skilled in the art. Consequently, the invention should be construed broadly, in accordance with its full spirit and scope.

What I claim is:

1. Apparatus for handling film including a component to which the film is to be pinned, a pinning electrode disposed adjacent to but spaced from said component for electrostatically charging the film, further means adjacent to the pinning electrode for creating at the pinning electrode a steep ionizing electric field gradient, and means for maintaining a first voltage between said pinning electrode and said further means while maintaining a second voltage less than said first voltage between said pinning electrode and said component, for minimizing the occurrence of arcing to said component while maintaining the ionizing effectiveness of said pinning electrode.

2. Apparatus in accordance with claim 1, wherein said last-named means includes a power supply that is grounded and wherein said further means includes a grounded part of the apparatus, said voltage maintaining means including means for maintaining said component at a potential between ground and the potential of the pinning electrode.

3. Apparatus in accordance with claim 1, including a high voltage supply that provides greater voltage than needed for pinning and a resistor interposed in the voltage-maintaining circuit for reducing the voltage available to the film-handling apparatus, the extent of voltage reduction increasing automatically with the growing tendency of the apparatus to lapse into an arc discharge as indicated by increasing current in the resistor.

4. Apparatus in accordance with claim 1, wherein said means for maintaining said second voltage includes a direct current supply and a resistor connected between said component and power supply, said means for maintaining said first voltage having connections that exclude said resistor.

5. Apparatus for casting plastic films, including a die for extruding a soft plastic film and a casting drum spaced from said die, said apparatus further including a pinning electrode adjacent to the path of the film emerging from said die and approaching said casting drum, and means for causing said electrode to ionize the air adjacent to the film for electrostatically charging the film and for causing the film to be attracted and thus pinned to the casting drum, said last-named means including means for establishing a first voltage difference between said pinning electrode and an adjacent part of the apparatus for inducing ionization at said pinning electrode, and means for establishing a lesser voltage difference between said pinning electrode and said casting drum for at least largely eliminating arcing at said casting drum.

6. Apparatus in accordance with claim 5, wherein said die constitutes said adjacent part of the apparatus.

7. Apparatus in accordance with claim 5, wherein said means for causing said electrode to ionize the air and for causing the film to be attracted and thus pinned to the casting drum includes a high-voltage direct-current supply whose positive terminal is connected to said pinning electrode and whose negative terminal is grounded, said part of the apparatus adjacent the pinning electrode being grounded, and a resistor interposed between the casting drum and ground for raising the potential of the drum closer to the potential of the pinning electrode under conditions of increasing current.

8. The method of effecting electrostatic pinning of a plastic film to a component in a film-handling apparatus in a manner to minimize arcing, which includes the steps of maintaining a steep high-voltage gradient at a pinning electrode adjacent to said component for creating an ion discharge to charge the film, and maintaining a voltage difference between said component and said pinning electrode that is substantially less than would be needed for creating said ion discharge but which is ample to cause pinning of the charged film to said component, thereby to minimize the occurrence of arcing to said component to occur.

9. The method as set forth in claim 8, further including the step of decreasing the voltage difference between said component and said pinning electrode as the current of said component increases.

References Cited

UNITED STATES PATENTS

| | | | |
|---|---|---|---|
| 287,957 | 11/1883 | Osborne | 226—1 |
| 2,289,774 | 7/1942 | Graves | 18—15 XR |
| 2,568,824 | 9/1951 | Rahbek | 226—94 XR |
| 3,068,510 | 12/1962 | Coleman | 18—15 XR |
| 3,068,528 | 12/1966 | Owens | 226—94 XR |

WILLIAM J. STEPHENSON, *Primary Examiner.*

U.S. Cl. X.R.

226—94; 264—24